United States Patent
Znidarsic et al.

(10) Patent No.: US 8,997,176 B1
(45) Date of Patent: Mar. 31, 2015

(54) DEVICE IDENTIFICATION BASED ON EVENT LOGS

(71) Applicant: Flexera Software LLC, Itasca, IL (US)

(72) Inventors: Jean Marie Znidarsic, Palo Alto, CA (US); David Znidarsic, Palo Alto, CA (US)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/303,518

(22) Filed: Jun. 12, 2014

(51) Int. Cl.
*G06F 21/00* (2013.01)
*H04L 29/06* (2006.01)

(52) U.S. Cl.
CPC ............ *H04L 63/20* (2013.01); *H04L 63/1416* (2013.01)
USPC .............................................. 726/1; 709/220

(58) Field of Classification Search
None
See application file for complete search history.

(56) References Cited

U.S. PATENT DOCUMENTS

| | | | |
|---|---|---|---|
| 2006/0206539 A1* | 9/2006 | Thompson | 707/202 |
| 2006/0253554 A1* | 11/2006 | Uwais | 709/220 |
| 2007/0220604 A1* | 9/2007 | Long | 726/22 |
| 2010/0070975 A1* | 3/2010 | Barker et al. | 718/102 |
| 2013/0007028 A1* | 1/2013 | Alkov et al. | 707/758 |
| 2013/0074100 A1* | 3/2013 | Faitelson et al. | 719/318 |
| 2013/0204880 A1* | 8/2013 | Lesiecki et al. | 707/748 |
| 2014/0173738 A1* | 6/2014 | Condry et al. | 726/25 |

* cited by examiner

*Primary Examiner* — Lisa Lewis
*Assistant Examiner* — Maung Lwin
(74) *Attorney, Agent, or Firm* — Michael A. Glenn; Perkins Coie LLP

(57) ABSTRACT

Some embodiments include a method of generating an event-based device ID based on an operating environment of a computing device. The method includes binding an event-based identifier and an events profile ID to a policy-related record that is associated with an externally controlled policy. The binding ensures that the policy is applied to the operating environment identified by the event-based identifier. The method includes generating the device ID based on event logs of the computing device.

23 Claims, 9 Drawing Sheets

550

| Keywords | Date and Time | Source | Event ID | Task Category |
|---|---|---|---|---|
| Audit Success | 2/23/2014 6:17:04 PM | Security-Auditing | 4672 | Special Logon |
| Audit Success | 2/23/2014 6:17:04 PM | Security-Auditing | 4624 | Logon |
| Audit Success | 2/23/2014 6:17:04 PM | Security-Auditing | 4672 | Special Logon |
| Audit Success | 2/23/2014 6:17:04 PM | Security-Auditing | 4624 | Logon |
| Audit Success | 2/23/2014 6:47:28 PM | Security-Auditing | 4672 | Special Logon |
| Audit Success | 2/23/2014 6:47:28 PM | Security-Auditing | 4624 | Logon |
| Audit Success | 2/23/2014 6:47:28 PM | Security-Auditing | 4672 | Special Logon |
| Audit Success | 2/23/2014 6:47:28 PM | Security-Auditing | 4624 | Logon |
| Audit Failure | 2/24/2014 10:00:32 AM | Security-Auditing | 6281 | System Integrity |
| Audit Success | 2/24/2014 10:30:49 AM | Security-Auditing | 4634 | Logoff |
| Audit Success | 2/24/2014 10:30:49 AM | Security-Auditing | 4624 | Logon |
| Audit Success | 2/24/2014 10:30:49 AM | Security-Auditing | 4672 | Special Logon |
| Audit Success | 2/24/2014 10:42:17 AM | Security-Auditing | 4624 | Logon |
| Audit Success | 2/24/2014 10:42:53 AM | Security-Auditing | 4634 | Logoff |
| Audit Success | 2/24/2014 10:42:53 AM | Security-Auditing | 4634 | Logoff |
| Audit Success | 2/24/2014 11:48:58 AM | Security-Auditing | 4672 | Special Logon |
| Audit Success | 2/24/2014 11:48:58 AM | Security-Auditing | 4624 | Logon |
| Audit Success | 2/24/2014 11:48:58 AM | Security-Auditing | 4672 | Special Logon |
| Audit Success | 2/24/2014 11:48:58 AM | Security-Auditing | 4624 | Logon |
| Audit Success | 2/24/2014 11:59:50 AM | Security-Auditing | 4624 | Logon |
| Audit Success | 2/24/2014 11:59:50 AM | Security-Auditing | 4624 | Logon |

| Level | Date and Time | Source | Event ID | Task Category |
|---|---|---|---|---|
| Warning | 2/23/2014 5:30:46 PM | Time-Service | 129 | None |
| Warning | 2/23/2014 5:30:46 PM | Time-Service | 129 | None |
| Warning | 2/23/2014 5:30:51 PM | Time-Service | 129 | None |
| Warning | 2/23/2014 5:30:51 PM | Time-Service | 129 | None |
| Warning | 2/23/2014 5:31:11 PM | Time-Service | 129 | None |
| Warning | 2/23/2014 5:31:11 PM | Time-Service | 129 | None |
| Warning | 2/23/2014 5:31:15 PM | Time-Service | 129 | None |
| Warning | 2/23/2014 5:31:15 PM | Time-Service | 129 | None |
| Information | 2/23/2014 5:31:43 PM | Service Control Manager | 7036 | None |
| Information | 2/23/2014 5:31:43 PM | Service Control Manager | 7036 | None |
| Warning | 2/23/2014 5:32:36 PM | Time-Service | 129 | None |
| Warning | 2/23/2014 5:32:36 PM | Time-Service | 129 | None |
| Warning | 2/23/2014 5:32:40 PM | Time-Service | 129 | None |
| Warning | 2/23/2014 5:32:40 PM | Time-Service | 129 | None |
| Warning | 2/23/2014 5:32:56 PM | Time-Service | 129 | None |
| Warning | 2/23/2014 5:32:56 PM | Time-Service | 129 | None |
| Warning | 2/23/2014 5:33:00 PM | Time-Service | 129 | None |
| Warning | 2/23/2014 5:33:00 PM | Time-Service | 129 | None |
| Warning | 2/23/2014 5:33:00 PM | Time-Service | 129 | None |
| Information | 2/23/2014 5:37:17 PM | Service Control Manager | 7036 | None |
| Information | 2/23/2014 5:37:17 PM | Service Control Manager | 7036 | None |
| Information | 2/23/2014 5:37:17 PM | Service Control Manager | 7036 | None |
| Information | 2/23/2014 5:38:55 PM | Service Control Manager | 7036 | None |
| Information | 2/23/2014 5:38:55 PM | Service Control Manager | 7036 | None |
| Information | 2/23/2014 5:38:55 PM | Service Control Manager | 7036 | None |
| Information | 2/23/2014 5:42:13 PM | Service Control Manager | 7036 | None |
| Information | 2/23/2014 5:42:13 PM | Service Control Manager | 7036 | None |
| Information | 2/23/2014 5:42:13 PM | Service Control Manager | 7036 | None |
| Information | 2/23/2014 5:42:14 PM | Service Control Manager | 7036 | None |
| Information | 2/23/2014 5:42:14 PM | Service Control Manager | 7036 | None |
| Information | 2/23/2014 5:42:14 PM | Service Control Manager | 7036 | None |
| Information | 2/23/2014 5:44:14 PM | Service Control Manager | 7036 | None |
| Information | 2/23/2014 5:44:14 PM | Service Control Manager | 7036 | None |
| Information | 2/23/2014 5:44:14 PM | Service Control Manager | 7036 | None |

*FIG. 5C*

```
Audit{SP}Success{HT}2/23/
2014{SP}6:17:04{SP}PM{HT}Security-Auditing{HT}4672{HT}Special{SP}Logon{CR}{LF}Audit{SP}Success{HT}2/23/
2014{SP}
6:17:04{SP}PM{HT}Security-Auditing{HT}4624{HT}Logon{CR}{LF}Audit{SP}Success{HT}2/23/
2014{SP}6:17:04{SP}PM{HT}Security-Auditing{HT}4672{H
T}Special{SP}Logon{CR}{LF}Audit{SP}Success{HT}2/23/
2014{SP}6:17:04{SP}PM{HT}Security-Auditing{HT}4624{HT}Logon{CR}{LF}Audit{SP}Success{H
T}2/23/
2014{SP}6:47:28{SP}PM{HT}Security-Auditing{HT}4672{HT}Special{SP}Logon{CR}{LF}Audit{SP}Success{HT}2/23/
2014{SP}6:47:28{SP}PM{HT}S
ecurity-Auditing{HT}4624{HT}Logon{CR}{LF}Audit{SP}Success{HT}2/23/
2014{SP}6:47:28{SP}PM{HT}Security-Auditing{HT}4672{HT}Special{SP}Logon
{CR}{LF}Audit{SP}Success{HT}2/23/
2014{SP}6:47:28{SP}PM{HT}Security-Auditing{HT}4624{HT}Logon{CR}{LF}Audit{SP}Failure{HT}2/24/2014{SP}10:
00:32{SP}AM{HT}Security-Auditing{HT}6281{HT}System{SP}Integrity{CR}{LF}Audit{SP}Success{HT}2/24/
2014{SP}10:30:49{SP}AM{HT}Security-Audit
ing{HT}4634{HT}Logoff{CR}{LF}Audit{SP}Success{HT}2/24/
2014{SP}10:30:49{SP}AM{HT}Security-Auditing{HT}4624{HT}Logon{CR}{LF}Audit{SP}Succe
ss{HT}2/24/
2014{SP}10:30:49{SP}AM{HT}Security-Auditing{HT}4672{HT}Special{SP}Logon{CR}{LF}Audit{SP}Success{HT}2/24/
2014{SP}10:42:17{SP}A
M{HT}Security-Auditing{HT}4624{HT}Logon{CR}{LF}Audit{SP}Success{HT}2/24/
2014{SP}10:42:53{SP}AM{HT}Security-Auditing{HT}4634{HT}Logoff{CR
}{LF}Audit{SP}Success{HT}2/24/
2014{SP}10:42:53{SP}AM{HT}Security-Auditing{HT}4634{HT}Logoff{CR}{LF}Audit{SP}Success{HT}2/24/
2014{SP}11:4
8:58{SP}AM{HT}Security-Auditing{HT}4672{HT}Special{SP}Logon{CR}{LF}Audit{SP}Success{HT}2/24/
2014{SP}11:48:58{SP}AM{HT}Security-Auditing{
HT}4624{HT}Logon{CR}{LF}Audit{SP}Success{HT}2/24/
2014{SP}11:48:58{SP}AM{HT}Security-Auditing{HT}4672{HT}Special{SP}Logon{CR}{LF}Audit{SP
}Success{HT}2/24/
2014{SP}11:48:58{SP}AM{HT}Security-Auditing{HT}4624{HT}Logon{CR}{LF}Audit{SP}Success{HT}2/24/
2014{SP}11:59:50{SP}AM{HT}
Security-Auditing{HT}4624{HT}Logon{CR}{LF}Audit{SP}Success{HT}2/24/
2014{SP}11:59:50{SP}AM{HT}Security-Auditing{HT}4624{HT}Logon{CR}{LF}2
/23/2014{SP}5:30:46{SP}PM{HT}Time-Service{HT}129{CR}{LF}2/23/
2014{SP}5:30:46{SP}PM{HT}Time-Service{HT}129{CR}{LF}2/23/2014{SP}5:30:51{SP
}PM{HT}Time-Service{HT}129{CR}{LF}2/23/2014{SP}5:30:51{SP}PM{HT}Time-Service{HT}129{CR}{LF}2/23/
2014{SP}5:31:11{SP}PM{HT}Time-Service{HT
}129{CR}{LF}2/23/2014{SP}5:31:11{SP}PM{HT}Time-Service{HT}129{CR}{LF}2/23/
2014{SP}5:31:15{SP}PM{HT}Time-Service{HT}129{CR}{LF}2/23/2014{
SP}5:31:15{SP}PM{HT}Time-Service{HT}129{CR}{LF}2/23/
2014{SP}5:31:43{SP}PM{HT}Service{SP}Control{SP}Manager{HT}7036{CR}{LF}2/23/2014{SP}5
:31:43{SP}PM{HT}Service{SP}Control{SP}Manager{HT}7036{CR}{LF}2/23/
2014{SP}5:32:36{SP}PM{HT}Time-Service{HT}129{CR}{LF}2/23/2014{SP}5:32:
36{SP}PM{HT}Time-Service{HT}129{CR}{LF}2/23/2014{SP}5:32:40{SP}PM{HT}Time-Service{HT}129{CR}{LF}2/23/
2014{SP}5:32:40{SP}PM{HT}Time-Servi
ce{HT}129{CR}{LF}2/23/2014{SP}5:32:56{SP}PM{HT}Time-Service{HT}129{CR}{LF}2/23/
2014{SP}5:32:56{SP}PM{HT}Time-Service{HT}129{CR}{LF}2/23/
2014{SP}5:33:00{SP}PM{HT}Time-Service{HT}129{CR}{LF}2/23/
2014{SP}5:33:00{SP}PM{HT}Time-Service{HT}129{CR}{LF}2/23/2014{SP}5:33:00{SP}PM{
HT}Time-Service{HT}129{CR}{LF}2/23/
2014{SP}5:37:17{SP}PM{HT}Service{SP}Control{SP}Manager{HT}7036{CR}{LF}2/23/2014{SP}5:37:17{SP}PM{HT}S
ervice{SP}Control{SP}Manager{HT}7036{CR}{LF}2/23/
2014{SP}5:37:17{SP}PM{HT}Service{SP}Control{SP}Manager{HT}7036{CR}{LF}2/23/2014{SP}5:38
:55{SP}PM{HT}Service{SP}Control{SP}Manager{HT}7036{CR}{LF}2/23/
2014{SP}5:38:55{SP}PM{HT}Service{SP}Control{SP}Manager{HT}7036{CR}{LF}2/2
3/2014{SP}5:38:55{SP}PM{HT}Service{SP}Control{SP}Manager{HT}7036{CR}{LF}2/23/
2014{SP}5:42:13{SP}PM{HT}Service{SP}Control{SP}Manager{HT}7
036{CR}{LF}2/23/2014{SP}5:42:13{SP}PM{HT}Service{SP}Control{SP}Manager{HT}7036{CR}{LF}2/23/
2014{SP}5:42:13{SP}PM{HT}Service{SP}Control{S
P}Manager{HT}7036{CR}{LF}2/23/2014{SP}5:42:14{SP}PM{HT}Service{SP}Control{SP}Manager{HT}7036{CR}{LF}2/23/
2014{SP}5:42:14{SP}PM{HT}Servic
e{SP}Control{SP}Manager{HT}7036{CR}{LF}2/23/
2014{SP}5:42:14{SP}PM{HT}Service{SP}Control{SP}Manager{HT}7036{CR}{LF}2/23/2014{SP}5:44:14{S
P}PM{HT}Service{SP}Control{SP}Manager{HT}7036{CR}{LF}2/23/
2014{SP}5:44:14{SP}PM{HT}Service{SP}Control{SP}Manager{HT}7036{CR}{LF}2/23/201
4{SP}5:44:14{SP}PM{HT}Service{SP}Control{SP}Manager{HT}7036{CR}{LF}
```

*FIG. 5D*

DEVICE IDENTIFICATION BASED ON EVENT LOGS

RELATED FIELD

At least one embodiment of this disclosure relates generally to security systems, and in particular, methods and systems to uniquely and accurately identify a computing device bound by an externally controlled policy.

BACKGROUND

There is an ever-increasing demand for security in the current digital age. Security comes in different forms. For example, companies, such as software licensors, policy makers, or other authoritative entities, regard the protection of agent storage spaces (e.g., a "trusted storage") and agent applications on foreign devices (e.g., consumer devices) not in their possession as an important priority. These companies may be referred to as external "influencers" of devices. These influencers may install policy-enforcing agents on the devices to ensure that certain policies or rules (e.g., access granting policies, usage restriction policies, or monitoring policies) are enforced on the devices without tampering. The policies may include policies regarding using the devices locally, using the devices to communicate with or access external resources, and remotely accessing the devices. In some cases, an influencer neither possesses nor owns the device it wants to influence. In other cases, the influencer owns the device, but does not possess the device.

An influencer remotely asserts influence over devices not in its possession through agent applications installed on the devices and by referring to the devices using some programmatically accessible identifier that uniquely identifies the device. That is, enforcement of the policies on a device depends on an identifier of the device. Therefore, if the possessor of the device wants to gain access previously denied according to the influencer's policies, remove existing access restrictions, or prevent activities from being monitored, then the possessor may attempt to change or replicate the device ID to circumvent the policies. For example, the possessor can change the device ID to impersonate other devices with different policies that matches the possessor's goals. Methodologies to change the device ID vary, and thus it has been a challenge to find a solution that is both accurate (e.g., not prone to false positive or false negatives) and resistant to exploits.

Traditionally, a device ID for a computing device is derived from one or more device component IDs that are stored in read-only memories (ROMs) of the device components. However, writing digital identification strings in the ROMs necessitates an inefficient manufacturing process. Other conventional techniques include storing a digital identification in a non-volatile memory of a device component instead of the ROM, thus enabling the manufacturer to serialize the device components in batches at the end of production. However, most non-volatile memories have relatively little safeguards against the possessor of the device component.

SUMMARY

Embodiments in this disclosure involves a device identification system utilizing event logs on a local computing device. The device identification system thwarts exploits described above by generating an event-based ID that cannot be changed after being associated with a policy (e.g., an access grant policy, a usage policy, a monitoring policy or a combination thereof) or an activity related to enforcing the policy ("enforcement activity record"); even if the event-based ID is tampered with or changed, the disclosed system would be able to detect the change. Some embodiments generate a set of event-based IDs that may evolve overtime. A "set" in this disclosure refers to a collection of one or more items or distinct data portions.

A computing device is uniquely identified (or at least substantially uniquely identified) by the set of event-based IDs or at least a subset of the event-based IDs. The set of event-based IDs is substantially unique when very few devices in the entire world have the same set of event-based IDs and when there is no easy way to find or access the devices with this same set of event-based IDs. For a substantially unique set of event-based IDs, devices with the same set of event-based IDs are highly likely to be possessed by different entities with disincentive, or at least no incentive, to collude with one another. For the purpose of discussion, either a single event-based ID or a set of event-based IDs may be referred to as the "event-based identifier" in this disclosure. Hereinafter, the term "unique" or "uniquely" can refer to either absolute uniqueness or substantial uniqueness.

The disclosed device identification system includes an agent application installed on the local computing device. The agent application enforces a policy (e.g., one of access granting policies, usage restriction policies, or monitoring policies) locally on behalf of an influencer entity. The agent application is configured to programmatically derive an event-based identifier without intervention by a possessor of the local computing device. The agent application can associate the derived event-based identifier with an events profile (e.g., together may be referred to as the "event-based device ID"). The agent application can cause the derived event-based device ID to bind with a policy-related record (e.g., a policy record or an enforcement activity record of the policy). For example, the agent application can send the event-based device ID to an influencer principal server that binds the event-based device ID to the policy-related record and send the bound policy-related record back to the agent application. The events profile enables the agent application to re-derive the event-based identifier at a later time utilizing the events profile. The re-derived event-based identifier can be used to compare against the recorded event-based identifier to validate the enforcement activity record. For example, the agent application can re-derive the event-based identifier when the enforcement activity needs to be validated. In some embodiments, the agent application regenerates the event-based identifier after every validation. In some embodiments, the agent application regenerates the event-based identifier every time a record (e.g., an enforcement activity record) needs to bind to the computing device.

The disclosed device identification system can derive the event-based identifier from event logs accessible through an operating system of the local computing device. Usually, from the moment a computing device is put into service, its operating system and/or software applications (e.g. browser, email, message, phone) start logging system and access activities for various purposes. For example, the operating system and/or the software applications can generate event logs for diagnostics, billing, maintenance, user specific history, other reasons to repeat or identify a previous electronic activity, etc. The events that are logged occur frequently enough and randomly enough that the sequence of events that are logged on two different devices during a specified time frame is substantially unique in the manner defined above. The possessor of the computing device has a high disincentive against tampering with the event logs generated by the operating system and/or the software applications, because many of the event logs are often tied to personalization of the applications and other functionalities of the computing device that the possessor of the computing device uses. This advantageously makes the event-based ID resistant against tampering by the possessor.

The longer the time frame, the more events will be logged, and thus the more likely that the sequence of events logged on one device would be substantially unique amongst a large pool of devices. The disclosed device identification system derives one or more event-based IDs based on these event logs. Each event in the event logs may include and/or be associated with multiple properties (e.g., event record, attributes, or metadata). The disclosed device identification system can utilize some or all of these properties to derive an event-based ID.

The disclosed device identification system can generate and bind an event-based ID to any record protected by the agent application. The event-based ID ensures that the record is associated with a known operating environment of a device, the operating environment represented by the event logs identified by the events profile used to generate the event-based ID. Because an event-based ID is not needed immediately after such a device is initialized into service, there may be several hundreds or thousands of events in event logs from which to derive an event-based ID by the time the disclosed system needs to generate the event-based ID.

Multiple of these event-based IDs may be used together to identify a device while each of the event-based IDs evolve separately. For example, the disclosed device identification system can determine that one of the event-based ID is obsolete or otherwise compromised and phase out the particular event-based ID while maintaining other event-based IDs in the set untouched. In some embodiments, after a policy is associated with a device, the device identification system generates a first set of the event-based IDs. Later in time, the device identification system can evolve the first set of the event-based IDs by adding, subtracting, or replacing event-based IDs derived from different event logs. The device identification system can further track the events profiles associated with how the event-based IDs are generated for later validation (e.g., by re-deriving the event-based IDs using the events profiles at a later time).

Some embodiments of this disclosure have other aspects, elements, features, and steps in addition to or in place of what is described above. These potential additions and replacements are described throughout the rest of the specification

BRIEF DESCRIPTION OF THE DRAWINGS

FIG. 5B and FIG. 5C respectively illustrate two example tables of events from a computer device.

FIG. 5D is an example of a sequence of characters for the events in the two tables of FIG. 5B and FIG. 5C.

The figures depict various embodiments of this disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
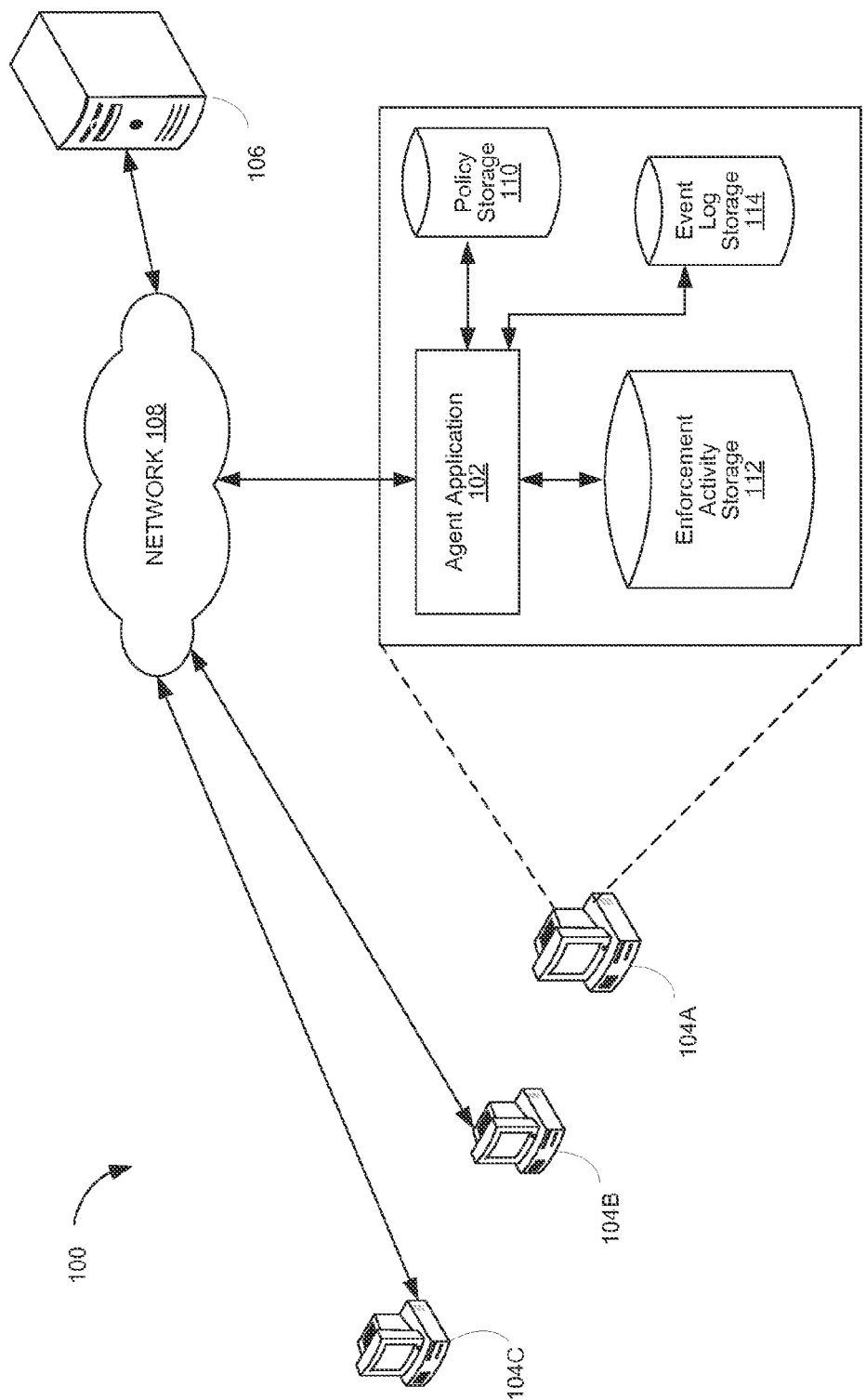
FIG. 1 is a block diagram of a system architecture of a secure policy management system, in accordance with various embodiments

FIG. 1 is a block diagram of a system architecture of a secure policy management system 100, in accordance with various embodiments. The secure policy management system 100 provides techniques to maintain one or more instances of an agent application 102 in one or more computing devices (e.g., a computing device 104A, a computing device 104B, and a computing device 104C, collectively as the "computing devices 104") for an influencer principal server 106. In some embodiments, each of the computing devices 104 is coupled to multiple influencer principal servers, each with its own agent application. The agent application 102 enforces one or more policies on behalf of the influencer principal server 106. The influencer principal server 106 can request the agent application 102 to report its event-based device ID, bind the event-based device ID to a policy-related record, and send the bound policy-related record back to the agent application 102. Subsequently, the agent application 102 can validate the policy-related record from time to time, e.g., periodically, upon request, or in response to one or more conditions.

For example, the computing devices 104 can be part of a local network in an enterprise. For another example, the computing devices 104 can be consumer devices (e.g., laptops, computer servers, mobile phones, mobile tablets, mobile computers, desktop computers, etc.) or special purpose devices (e.g., networking equipment, medical devices, machine-to-machine sensors, etc.). The computing devices 104 can be inter-connected via a network 108, such as the Internet or a local network.

The influencer principal server 106 can actively or passively communicate with instances of the agent application 102 running on the computing devices 104 such that the agent application 102 can enforce one or more policies, including at least an access grant policy (granting access to a local or an external resource, functionality, or service), an usage restriction policy (imposing one or more limitations on usage of the computing devices 104), a monitoring policy (indicating what activities of the computing devices 104 should be monitored), or any combination thereof. The agent application 102 enforces these policies on behalf of the influencer principal server 106 across the network 108. These policies can be stored in a policy storage 110. The policy storage 110 is a memory agent storing data in the computing devices 104 for the influencer principal server 106. The policy storage 110 acts as an agent of the influencer principal server 106 such that only agents of the influencer (e.g., the influencer principal server 106 or other instances of the agent application 102) are allowed to access (e.g., modify, create, or read) the data therein. Access to the policy storage 110 can be granted via cryptographic authentication.

When enforcing the policies, the agent application 102 can also maintain an enforcement activity storage 112. The agent application 102 can initiate, facilitate and/or participate in computing activities on the computing devices 104 to enforce the policies and duties prescribed by the influencer (e.g., policies that are configured as instructions to the computing devices 104). The enforcement activity storage 112 is also a memory agent storing data in the computing devices 104 for the influencer principal server 106. In some embodiments, the enforcement activity storage 112 is the same storage as the policy storage 110.

In some embodiments, the agent application 102 can determine an events profile and generate an event-based identifier based on the events profile. The agent application 102 then combine (e.g., by concatenating) the event-based identifier and an events profile identifier together into an event-based device ID. The events profile identifier corresponds to the events profile used to generate the event-based identifier. In some embodiments, the influencer principal server 106 activates a policy or a policy change by requesting the agent application 102 to generate the event-based device ID (e.g., the concatenation of the event-based identifier and the corresponding events profile identifier) and binding the event-based device ID to a policy-related record, and sending the bound policy-related record back to the agent application 102 to store in the policy storage 110 or the enforcement activity storage 112. The binding may include the influencer principal server 106 cryptographically signing the bound policy-related record.

In an example where the influencer is a licensor (e.g., software vendors, software-as-a-service provider, e-commerce service, or content author granting access on a customer's device), the enforcement activity storage 112 can store fulfillment records of licenses assigned to one of the computing devices 104 (e.g., the computing device 104A). The policy storage 110 can store limitations on what the computing device 104A can do with the assigned licenses. In the example where the influencer is a policy maker (e.g., Information Technology (IT) department of a company, other regulatory department governing its employees' devices, a compliance agency, or a parent or school restricting devices of children), the policy storage 110 can store a list of usage, access, or functional restrictions on the computing device 104A; and the enforcement activity storage 112 can store activities involving usage pattern of the restricted devices. In an example where the influencer is a monitoring entity (e.g., a parent or a school monitoring a child's device, a business intelligence agency, a company monitoring its employees, a law enforcement agency monitoring a suspect's device, an advertiser monitoring a prospective customer's device, an auditor, etc.), the policy storage 110 can store a list of activities, conditions, or circumstances to monitor, and the enforcement activity storage 112 can store a record of activities captured from the monitoring.

The agent application 102, at times, validates the binding (e.g., digital signature of the binding by the influencer principal server 106) of the policy-related records in the policy storage 110 and/or the enforcement activity storage 112. This validation process can occur periodically, or upon the agent application 102 detecting that one or more conditions are met on the computing device 104A. To validate, the agent application 102 can re-generate the event-based device ID to compare against the original event-based device ID bound to a policy-related record.

At a later time, to validate the policy-related record secured by the agent application 102, the agent application 102 verifies the operating environment by dynamically re-generating an event-based identifier based on real-time event logs stored in the computing device 104A according to the events profile that specifies what events and properties to extract to generate a real-time event-based identifier. The agent application 102 compares the real-time event-based identifier against the bound event-based identifier previously recorded in the policy-related record.

In some embodiments, the event-based identifier is a set of one or more event-based IDs, each event-based ID corresponding to a different properties (events, parameters, attributes, or metadata) of event logs. The event-based IDs may correspond to different sets of the event logs. The event logs may be accessed from an event log storage 114 managed by an operating system of the computing device 104A or applications of the operating system. The event log storage 114 may be distributed across one or more filesystems maintained by the operating system.

Figure 2:
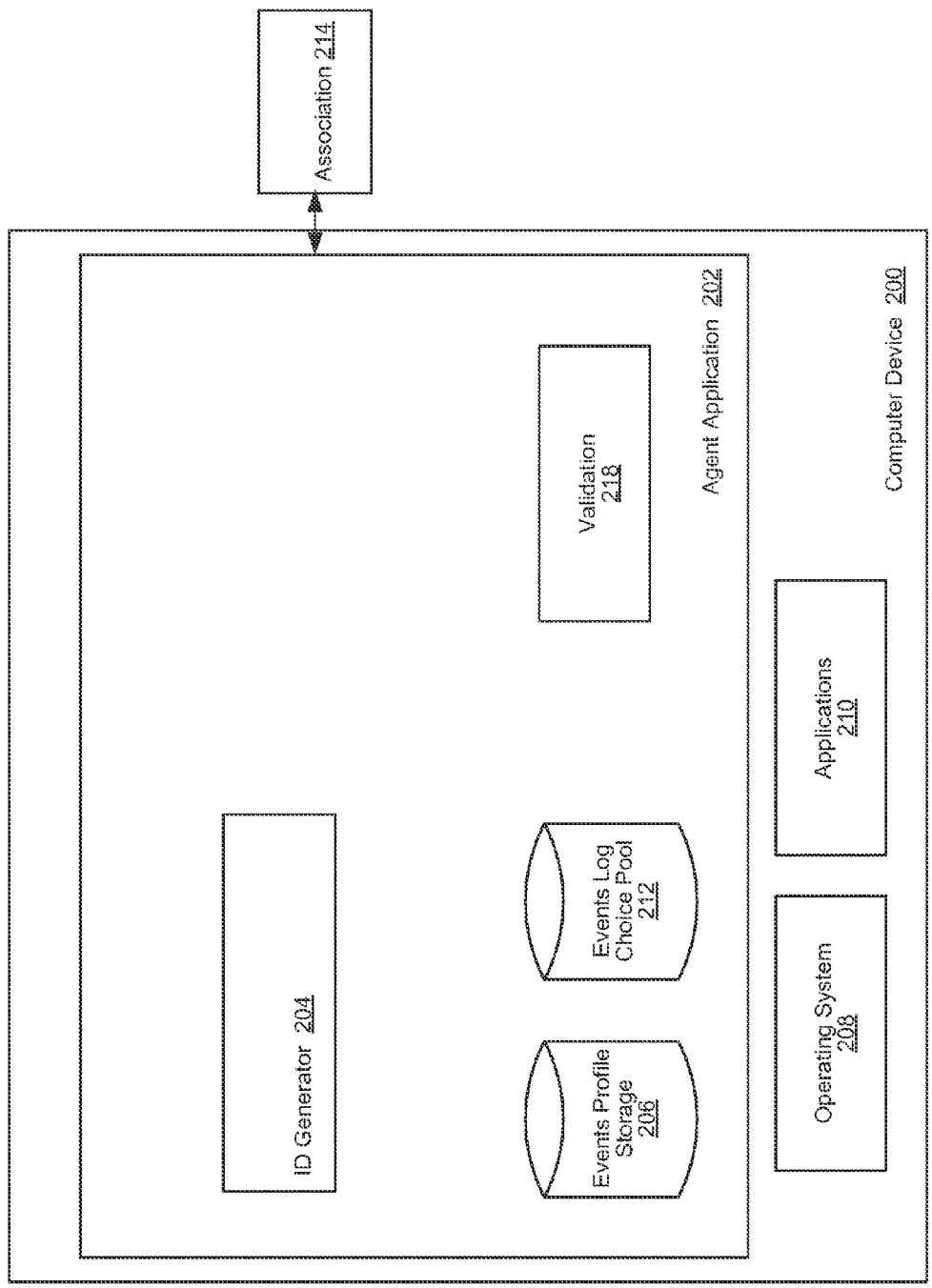
FIG. 2 is a block diagram of an example of a computer device having an agent application installed thereon, in accordance with various embodiments.

FIG. 2 is a block diagram of an example of a computer device 200 (e.g., one of the computing devices 104 of FIG. 1) having an agent application 202 (e.g., the agent application 102 of FIG. 1) installed thereon, in accordance with various embodiments. The agent application 202 can interface with an external server (e.g., the influencer principal server 106 of FIG. 1) to validate data and policies (e.g., the policy storage 110 and/or the enforcement activity storage 112 of FIG. 1) stored on the computer device 200.

The agent application 202 includes an ID generator module 204. The ID generator module 204 implements instructions to configure the computer device 200 to derive an event-based ID based on an events profile. The event-based ID is a "device ID" that is calculated based on event logs of the operating environment. The event-based ID is a device ID derived from event properties (e.g., attributes, data entry, or metadata recorded in an event log) selected according to the events profile. In order to be able to dynamically regenerate the event-based ID, the ID generator module 204 can record associations between the events profile used with an events profile ID (e.g., in an events profile ID table) and combining the events profile ID with the event-based ID (e.g., by prepending or appending the events profile ID to the event-based ID).

For example, the agent application 202 can maintain an events profile storage 206 to store one or more events profiles. Each of the events profiles may be associated with an events profile ID. The events profile ID is an identifier assigned to each unique events profile on the computer device 200. Each events profile includes a list of one or more event logs maintained by an operating system 208 or applications 210 of the computer device 200. The list of the event logs can be an ordered list. Each events profile further includes a list (e.g., an ordered list) of one or more event properties for each of these event logs and a list (e.g., an ordered list) of one or more time ranges for each of these event logs.

The time ranges can be expressed in any granularity; for example, down to the millisecond, second, minute, hour, day, etc. The ID generator module 204 can determine and choose these time ranges so that there is (or likely is) a large enough number of events logged in the time ranges to increase the likelihood that the sequence of events are plausibly unique. The ID generator module 204 can also limit the size of the time ranges so that there are not so many events in the time ranges that dynamic generation of the event-based IDs will take a long time to derive from the sequence of events.

Each event log provides the raw data for the ID generator module 204 to determine an ordered list of events and event properties that were logged between two arbitrary moments in time. In some embodiments, the ID generator module 204 determines these moments in time from timestamps associated with logged events in the event log. In other embodiments, the ID generator module 204 can determine an ordered list of events and event properties by analyzing metadata of the event logs provided by either the operating system 208 or the applications 210. The event logs can be chosen from an event log choice pool 212. The ID generator module 204 can maintain the event log choice pool 212 by identifying, and maintaining references to, all available event logs, event properties, and time ranges that are readable through the operating system 208.

To generate an event-based ID, the ID generator module 204 uses the events profile to identify inputs to a compression function (e.g., a hash function). The ID generator module 204 then references the event log choice pool 212 to extract the event properties in specific time ranges from specific event logs (accessible on the operating system 208 by the agent application 202) according to the events profile. The ID generator module 204 then utilizes the extracted event properties as inputs to the compression function to generate a compressed output that serves as the event-based ID. In some embodiments, the event properties is concatenated before being used as an input to the compression function (e.g., a hash function that takes in a single input). In some embodiments, the concatenated event properties can serve as the event-based ID without being made into a compressed output.

For some compression functions, order of inputs to the compression functions changes outputs of the compression functions. Hence, while the order of the event logs, the order of the event properties, and the order of the time ranges in a given events profile may be arbitrary, these orders have to be consistent every time an event-based ID is derived from the given events profile.

The agent application is coupled to an association module 214 (e.g., implemented by an external device, such as the influence principal server 106 of FIG. 1). The association module 214 implements instructions to bind an event-based ID to a policy-related record (e.g., an enforcement activity record or a policy). The association module 214 can associate multiple event-based IDs (e.g., an event ID set) to the policy-related record. The association module 214 can also bind the events profiles IDs (e.g., an events profile set) corresponding to the events profiles, which are used to generate the multiple event-based IDs, to the policy-related record. The association module 214 can digitally sign the policy-related record bound to the event-based ID set and the profile ID set.

The agent application includes a validation module 218. The validation module 218 implements instructions to configure the computer device 200 to re-derive one or more of the event-based IDs (e.g., via the ID generator module 204) in real-time and compare the event-based IDs against the event-based IDs previously bound to a policy-related record. The comparison may occur locally on the computer device 200. If a dynamically generated set of event-based IDs do not match a previously bound set of event-based IDs, then the agent application can assume that tampering occurred on the computer device 200 and that security has been compromised.

In some embodiments, when only a subset of the dynamically generated set does not match the previously bound set, instead of automatically assuming that security has been breached, the validation module 218 determines that the mismatching pair or pairs of the events profile and a corresponding event-based ID have to be updated. For example, the validation module 218 may include multiple threshold levels, where at each threshold level, the validation module 218 determines whether to suggest a renewal of the event-based ID or whether to consider the validation (e.g., matching) successful. At a first threshold, where if a first percentage ($T_1$) of the event-based IDs do not match, then the security is considered breached; otherwise the validation module 218 determines a match. The validation module 218 may also include a second threshold, where if a second percentage ($T_2$, $T_2 < T_1$) of the event-based IDs do not match, then the formulas (e.g., the events profiles) for the non-matching event-based IDs need to expire and be renewed; otherwise the validation module 218 determines a match.

Evolving the Event-Based IDs to Improve Security

The ID generator module 204 can renew an events profile associated with generating an event-based ID. When renewing the events profile, the ID generator module 204 can pick a new list of event logs, event properties, and time ranges for the event logs that are used as inputs to generate a compressed output that serves as the event-based ID. After the events profile is renewed, a new events profile ID is assigned to the new events profile. The new events profile ID is then associated with the policy-related records protected by the agent application 202.

The ID generator module 204 advantageously evolve the generated event-based ID with an operating environment of a device instead of maintaining a constant/permanent identifier. A conventional device ID, which is usually an ID of one of the device's machine components (or a blend of a device's machine components), does not change over time. For a conventional device ID, if a possessor of a device wants to tamper with an agent application installed on the device, the possessor need only to identify a single fixed target (or a small set of fixed targets) to attack. Once successfully retrieving the fixed target or targets, all future policy-related records associated with the conventional device ID are compromised. However, the disclosed ID generator 204, at a given moment in time, can maintain multiple events profiles for dynamically calculating real-time event-based IDs to match against previously bound IDs using the same events profiles. The events profiles can be based on multiple event logs, properties, and time ranges from a choice pool of event logs. This advantageously obfuscates potential attacks by making it difficult to replicate the event-based IDs.

Also, as new applications are installed, new event logs become available, and as time goes by, more time ranges are available in old and new event logs. Therefore, it is possible for each policy-related record that needs to be secured to be bound by a different and unique set of event-based IDs from each other. To achieve this, the ID generator module 204 can vary the event-based IDs it returns to the association module 214 by choosing different event logs, properties, and time spans for each.

In some embodiments, the association module 214 can bind a policy-related record to one or more event-based IDs and one or more machine component IDs. In this case, the validation module 218 would assign a weight to the percentage of event-based IDs that match and assign weights to the machine component IDs that match. This weighting mechanism and the choosing of weights can be configured to minimize false positive validations and false negative validations.

Compatibility with Rolling Event Log Time Window (Log Pruning)

Not all events in an event log are retained forever. Older events are sometimes pruned from an event log to make room for newer events to keep the event log from growing no greater than a specified size. For example, on a Windows computer which is not specially configured, 6 months of events are retained in most logs managed by the Windows Event Viewer.

In some embodiments, if the expected lifespan of the events from which an event-based ID is derived is shorter than the expected lifespan of the policy-related record to which the event-based ID is bound, then before the older events are pruned, the bound policy-related record can be re-bound to an event-based ID which is derived from more recent events, and used to replace the previous policy-related record.

In some embodiments, the association module 214 records the list of all event-based IDs ever bound to a policy-related record, even if some of those event-based IDs can no longer be validated because they are derived from events which have been pruned or tampered with. For example, a system which does not require a device's event-based ID to be validated may still refer to that device by an event-based ID that can no longer be validated. The preferred way to do this is by only ever adding new event-based IDs to a policy-related record, and never removing any. Here is an example of a license right bound (via a digital signature) to one event-based ID:
License=AdobeAcrobat; Event-based Device IDs=23|5709F8CE6147FF45212948BDA8AB7E3F; DigitalSignature=DC17AE02B0648C2B44E0A2C75FBA8A7FB10967B51209A0

In this example, one of the events used to derive the above Event ID has been pruned or tampered with. Either before or after the pruning, a new event-based ID can be derived and added to the policy-related record and digitally re-signed (e.g., re-bound), for example:
License=AdobeAcrobat; Event-based Device IDs=23|5709F8CE6147FF45212948BDA8AB7E3F, 24|B555C03644F985352BC5C1C10C923697; DigitalSignature=C244BF331D77BE2D97FE729FC1B466F6241A6B560B7263

In some embodiments, because retaining an event-based ID, which can no longer be matched, will skew the validation calculation, as would be the case when attempting to match all (or a high percentage) of the listed event-based IDs, then the association module 214 can bind a separate list of legacy event-based IDs, to a policy-related record, that would not be used in the validation calculation (e.g., by the validation module 218) to the policy-related record, such as:
License=AdobeAcrobat; LegacyEvent-based Device IDs=23|5709F8CE6147FF45212948BDA8AB7E3F; Event-based Device IDs=24|B555C03644F985352BC5C1C10C923697; DigitalSignature=95771254E5F534C5A4A1FAA35DD947401D3EDBDBAD7D81

Protection Against Tampering of Event Logs

Because event logs are generated by either the operating system or by applications running on the operating system, these event logs are stored in the non-volatile memory of the computer device 200 (for example, hard disk or flash memory). As such, the possessor of the computer device 200 might be able to change or remove one or more event logs.

To protect against this potential issue, a single policy-related record can be bound to more than one event-based ID, preferably many, where each event-based ID is derived from many different event logs and many different recent time ranges (recent time ranges prevents exacerbating the issue by running into log pruning problems described above). The validation module 218 can choose one of the following comparison strategies. A first strategy involves validating a policy-related record if only one event-based ID bound to the policy-related record is equal to an event-based ID derived at the time of validation. This first strategy would make it easier for the possessor of the computer device 200 to copy event logs to another device in order to duplicate rights to the other device (e.g., where the policy involved is a "category 1" policy that grants access rights). This strategy, however, would make it harder for the possessor of the computer device 200 to alter event logs on the computer device 200 to avoid the policy restrictions (e.g., where the policy involved is a "category 2" policy restricting usage rights) and access monitoring (e.g., where the policy involved is a "category 3" policy indicating a computer activity monitoring requirement). Therefore, in some embodiments, if the validation module 218 detects that the policy-related record matches to categories 2 or 3 policies, then the validation module 218 should choose the first strategy.

A second strategy involves validating a policy-related record only if all event-based IDs bound to the policy-related record are equal to those derived at the time of validation. This would make it harder for the possessor of the computer device 200 to copy event logs to another device in order to duplicate rights to the other device (e.g., in the case of the category 1 policies). However, this would make it easier for the possessor of the computer device 200 to alter event logs on the computer device 200 to avoid any policy restrictions (e.g., in the case of category 2 policies) and access monitoring (e.g., in the case of category 3 policies). Therefore, in some embodiments, if the validation module 218 detects that the policy-related record corresponds to a category 1 policy, it chooses the second strategy.

However, there is a risk of not validating a category 1 policy-related record if even one of the event-based IDs is derived from events that have been pruned in the natural management of an event log. Therefore, in some embodiments, the validation module 218 can adopt a third strategy by choosing a threshold that is somewhere between matching half of the event-based IDs and matching all event-based IDs; for example, 75% of the event-based IDs. The third strategy involves validating a policy-related record if more than one event-based ID and less than all event-based IDs, bound to the policy-related record, matches those event-based IDs derived at the time of validation. The third strategy is useful if the validation module 218 does not know the category of the policy corresponding to the policy-related record. In that case, the validation module 218 can choose a threshold in the middle between matching one event-based ID and matching all event-based IDs.

Binding a Policy Related Record to a Virtual Machine

If the computer device 200 is a virtual machine which can be cloned, then, at the time of cloning the original virtual machine and all its clones would have identical disk images and thus identical event logs. Therefore, all event-based IDs derived from the original virtual machine before cloning (that can be validated at the time of cloning) can continue to be validated by the original virtual machine and all its clones. This can be used to a category 1 policy, but not categories 2 or 3 policies. This describes the same vulnerability for device IDs which are IDs of machine components. However, unlike machine components, the instant that a clone is made, the clone will start logging events in patterns which are unique to it.

Some embodiments resolve the above issue by having a policy-related record bound to a new event-based ID on a periodic basis so that the issue (e.g., for a policy-related record corresponding to a category 1 policy) only exists on a clone of a virtual machine from the time the clone is first started after cloning until a new event-based ID is bound to the policy-related record.

This issue would not be fixable when using device IDs that are IDs of machine components because new machine component IDs are not expected to be added frequently enough, if at all. Accordingly, the clones of the virtual machine would continue to have the same machine component IDs as the original virtual machine, enabling a possessor of the computer device 200 to circumvent a category 1 policy.

Regarding FIG. 1 and FIG. 2, portions of components and/or modules associated with the computing device 104A and the computer device 200 may each be implemented in the form of one or more appropriately programmed programmable processors, in the form of special-purpose circuitry, or a combination thereof. The computing device 104A and/or the computer device 200 can include additional, fewer, or different modules for various applications.

For example, the modules described can be implemented as instructions on a tangible storage memory capable of being executed by a processor or a controller. Tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine, a distributed operating system, or any combination thereof. Memory spaces and storages described in the figures can be also implemented with tangible storage memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module. A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component.

Figure 3:
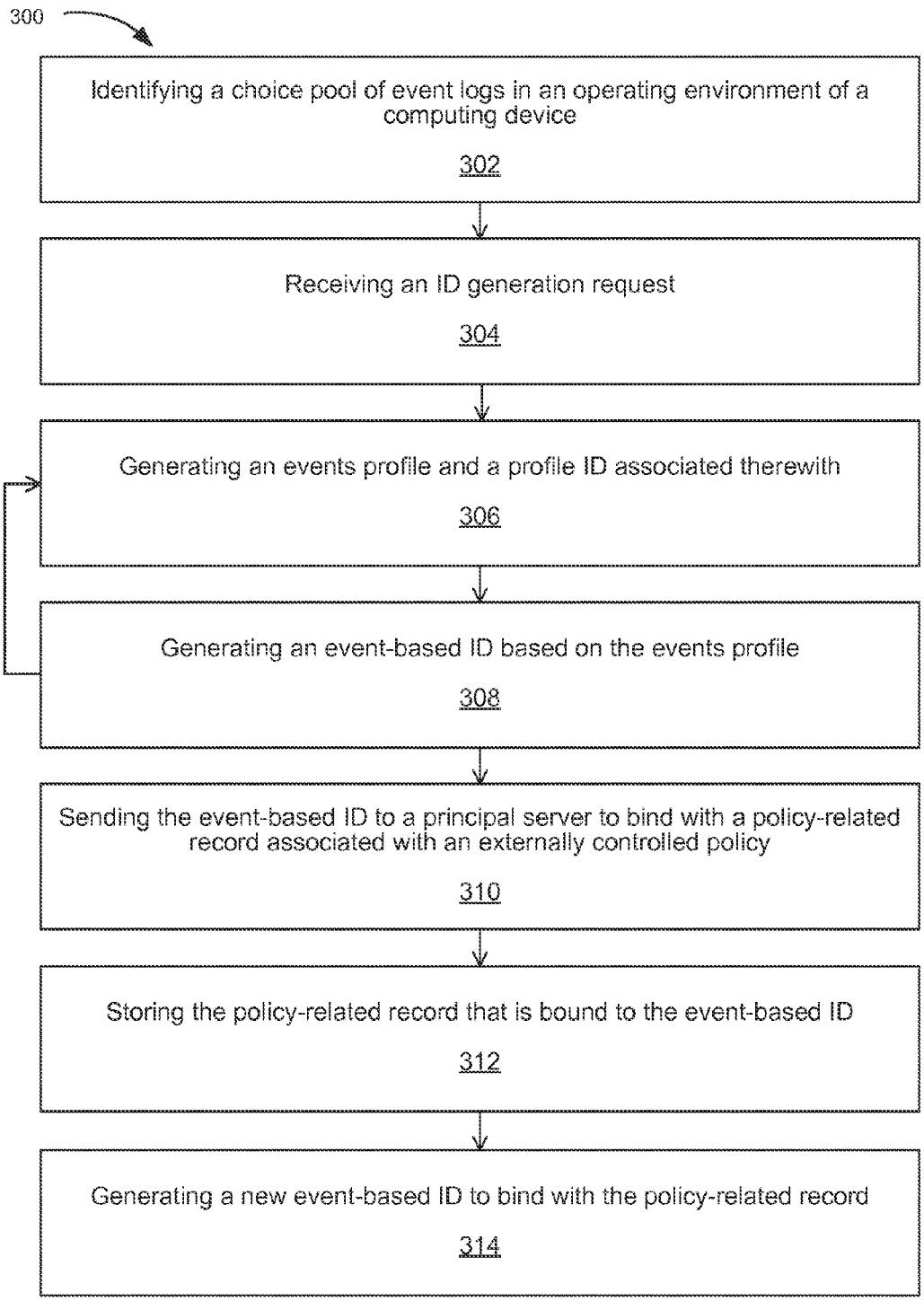
FIG. 3 illustrates a method of binding one or more event-based device IDs with a policy-related record, in accordance with various embodiments

FIG. 3 illustrates a method 300 of binding one or more event-based IDs with a policy-related record, in accordance with various embodiments. For example, the method 300 can be performed by a computing device (e.g., the computer device 200 of FIG. 2 or the computing device 600 of FIG. 6). The computing device can be a physical device or a virtual machine. The method 300 enables the event-based IDs bound to the computing device to uniquely identify an operating environment of the computing device. At step 302, an ID generator (e.g., the ID generator module 204 of FIG. 2) identifies a choice pool of candidate event logs (e.g., the event log choice pool 212 of FIG. 2) in the operating environment of the computing device. In some embodiments, identifying the choice pool includes identifying the candidate event logs that are readable-only files on a filesystem of the operating environment. In some embodiments, identifying the choice pool includes maintaining the choice pool by monitoring for any new event log that becomes available through the operating environment. In some embodiments, identifying the choice pool includes analyzing a uniqueness factor of the candidate event logs in the choice pool based on log size of the candidate event logs or diversity of values of event properties represented in the candidate event logs.

The choice pool contains candidate event logs from which the ID generator may select one or more event logs as bases of generating one or more event-based IDs. The choice pool is dependent upon the computing device's operating environment. The choice pool may include a choice pool of candidate event logs, a choice pool of event properties, and a choice pool of time ranges. The choice pool of event properties is dependent upon the choice pool of candidate event logs. The choice pool of time ranges can be arbitrary within the total lifetimes of the candidate event logs. In some embodiments, at least one of the time ranges ends at the current time (i.e., at the time the event-based ID is being generated, such as at the time when the method 300 is initiated) in order to use the most recent events. These three choices can form an events profile. In some embodiments, the events profile may include other values.

The choice pool of the event logs can be retrieved from an operating system and/or one or more applications running on the operating system. For example, on a Windows™ computer, many event logs is accessible through the "Event Viewer" system. In some embodiments, the ID generator can create the choice pool of candidate event logs from the "Event Viewer." In various examples, the choice pool can include candidate event logs that are not accessible through a single system like the Windows Event Viewer.

An influencer principal server can request a device ID to be generated from an agent application (e.g., the agent application 102 of FIG. 1, the agent application 202 of FIG. 2, or the agent application 504 of FIG. 5) of the computing device. The agent application in turn can request the device ID to be generated by the ID generator. That is, at step 304, the ID generator receives an ID generation request from the agent application to generate and bind an identifier of the operating environment to a policy-related record associated with an externally controlled policy enforced through the agent application. In response to the ID generation request, the ID generator generates an events profile and a profile ID associated with the events profile at step 306. Generating the events profile at least includes selecting a first event log from the choice pool and selecting a first event property from the first event log. In most cases, the events profile includes selecting multiple event properties from multiple event logs from the choice pool of candidate event logs as described above. For example, at step 306, the ID generator chooses one or more ordered event logs, one or more ordered event properties in each chosen event log, and one or more ordered time ranges in each chosen event log for the events profile as the bases for calculating an event-based ID.

If this events profile is different than any other events profile previously chosen by the ID generator, the ID generator assigns a new events profile ID to the events profile and stores the events profile ID and its events profile for later reference. If this events profile (and its events profile ID) has been previously stored, the ID generator retrieves the events profile and its events profile ID.

At step 308, the ID generator generates an event-based ID according to the events profile that specifies the chosen event logs, event properties, and time ranges for generating the event-based ID. For example, the ID generator can extract event properties according to the events profile from the runtime operating environment of the computing device. The ID generator can compress the event properties into an output value (e.g., a hash string) via a compression function (e.g., a hash function). The output (i.e., the hash value) of the compression function can serve as part of the event-based ID. The ID generator can pre-pend or append the events profile ID to the output (e.g., a hash string). Steps 304 and 306 can be repeated to generate an entire event-based ID set including one or more event-based IDs, each event-based ID corresponding to a different events profile. Each unique events profile in turn is associated with a different profile ID.

At step 310, the agent application sends the event-based IDs to an association module (e.g., the association module 214 of FIG. 2). The association module binds the one or more event-based IDs in the event-based ID set to the policy-related record. This binding is made in a way to prevent a possessor of the computing device from breaking or deleting the binding between the policy-related record and the one or more event-based IDs without being detected. For example, the policy-related record and the one or more event-based IDs can be digitally signed or encrypted. At step 312, the agent application stores the policy-related record that is bound to the event-based ID set in a trusted storage, such as a trusted storage maintained on behalf of a principal server (e.g., the influencer principal server 106 of FIG. 1).

At step 314, the agent application can generate (or re-generate) a new event-based ID to bind to the policy-related record. The new event-based ID can be an additional binding or a replacement binding to the existing bound event-based IDs associated with the policy-related record. Step 314 can be in response to a schedule to renew and evolve event-based IDs bound to the policy-related record to increase the level of security. Step 314 can also be in response to one or more failed attempts to match a previously bound event-based ID (e.g., during validation). That is, when a large fraction of bound event-based IDs matches and a small fraction mismatches, the small fraction of bound event-based IDs can be renewed by the agent application. This can be achieved by substituting the mismatched event-based IDs with new event-based IDs or by labeling the mismatched event-based IDs as legacy IDs and binding the new event-based IDs to the policy-related record.

For example, step 314 can include generating a new events profile and a new profile ID associated with the new events profile, in response to determining that the policy-related record is updated. The new events profile is at least partially different from the events profile. The new events profile specifies at least a second event property in a second event log. In this example, the ID generator can generate a new event-based device ID based at least partly on the second event property extracted from the second event log according to the new events profile. The new event-based device ID includes a reference to the new profile ID. The association module then binds the new event-based device ID with the updated policy-related record.

Figure 4:
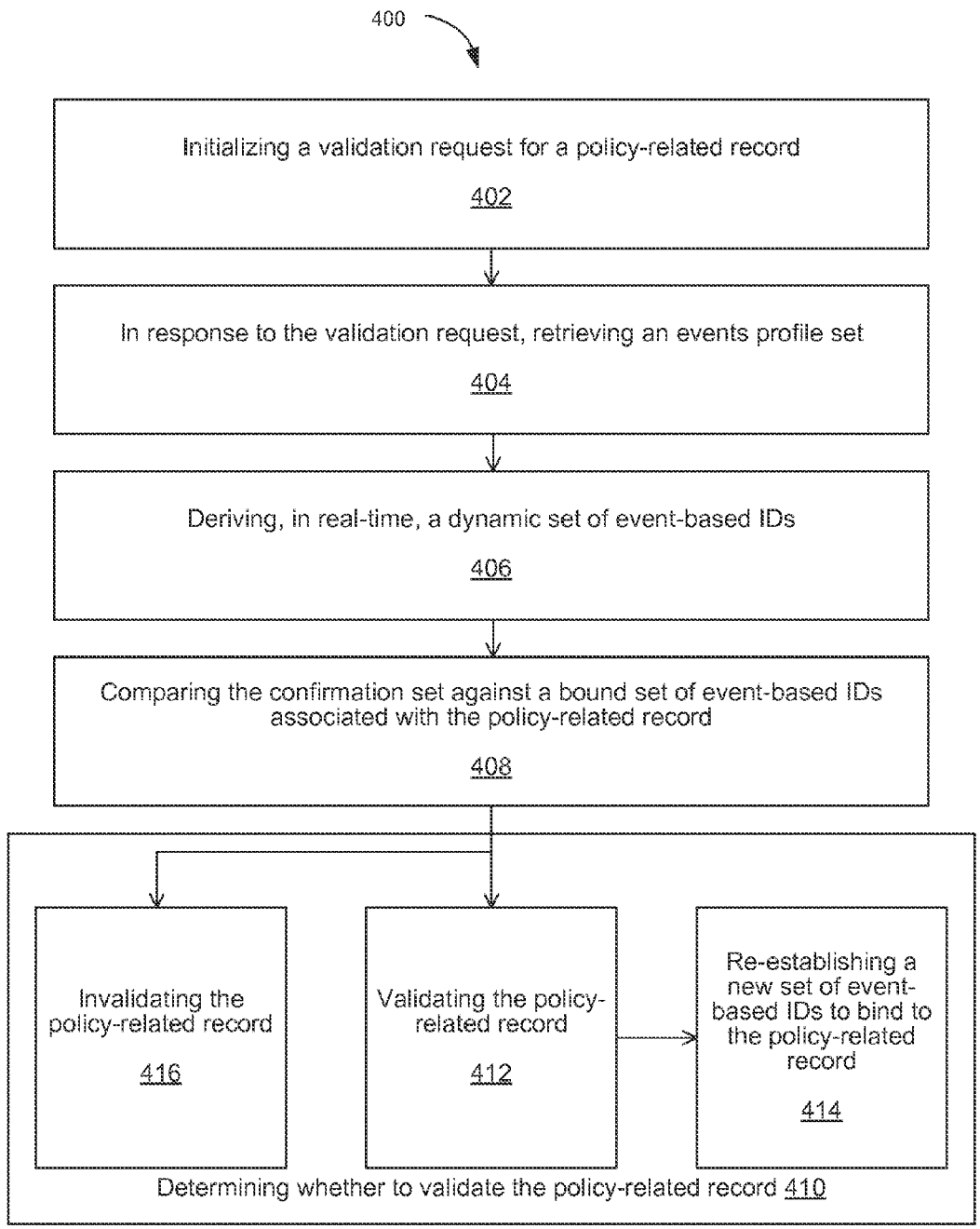
FIG. 4 illustrates a method of validating that a policy-related record applies to a computing device and is tamper-free, in accordance with various embodiments.

FIG. 4 illustrates a method 400 of validating that a policy-related record (associated with enforcing an externally controlled policy) applies to a computing device (e.g., the computer device 200 of FIG. 2) and is tamper-free, in accordance with various embodiments. The method 400 may be performed at least partially by a validation module (e.g., the validation module 218 of FIG. 2) of the computing device and/or an external server. At step 402, the validation module initiates a validation request for the policy-related record. The policy-related record is associated an externally controlled policy that is enforced by an agent application (e.g., the agent application 102 of FIG. 1 or the agent application 202 of FIG. 2) in the computing device.

In response to the validation request, the validation module retrieves, at step 404, an events profile set (e.g., one or more events profiles) associated with a bound ID set (including one or more event-based IDs originally generated by the method 300 of FIG. 3) that is bound to the policy-related record (e.g., by an influencer principal server). The bound ID set may be referred to as an "original ID set." Step 404 can include the validation module retrieving one or more events profile IDs from the original event-based IDs in the bound ID set. The validation module can then match the events profile IDs to data storage links referencing storage locations of event logs in a filesystem (e.g., the filesystem 508 of FIG. 5) of the computing device. The agent application, for example, maintains the data storage links since a time when the ID generator generated the original event-based IDs. For example, the data storage links may be stored in the events profile storage 206 of FIG. 2 or the events profiles table 512 of FIG. 5.

At step 406, the validation module requests an ID generator (e.g., the ID generator module 204 of FIG. 2) to derive, in real-time (i.e., dynamically), a dynamic confirmation set of event-based IDs according to the events profiles of the events profile set. For example, the ID generator can derive a first dynamic event-based ID based at least partly on one or more event properties in one or more event logs as identified in one of the events profiles. The event logs can be event logs maintained by an operating system of the computing device or an application running on the operating system. In some embodiments, deriving the dynamic confirmation set includes generating hash values based on respective event properties according to respective event profiles. The ID generator can use the hash values as part of the respective event-based IDs in the dynamic confirmation set. Deriving of the first dynamic event-based ID can be logically similar to generating a first original event-based ID bound to the policy-related record except that this derivation utilizes the event properties (according to an events profile) found in the filesystem at the time of validating (e.g., the method 400) instead of at the time of the original generation (e.g., the method 300 of FIG. 3).

At step 408, the validation module compares the dynamic confirmation set of event-based IDs against the bound ID set. Step 406 can compare each derived event-based ID in the dynamic confirmation set against a corresponding originally bound event-based ID in the bound ID set. Then, the validation module, at step 410, determines whether to validate the policy-related record based on whether the dynamic confirmation set matches the bound ID set.

In response to determining that the dynamic confirmation set fully matches the bound ID set, the validation module can authenticate the policy-related record in sub-step 412. In response to determining that the dynamic confirmation set partially matches the bound ID set, the validation module can either (a) authenticate the policy-related record and, in some embodiments, generate and bind, a new set of event-based IDs based on a new set of events profiles (e.g., when more than a threshold fraction of event-based IDs matches), to the policy-related record in sub-step 414, or (b) invalidate the policy-related record (e.g., when less than or equal to the threshold fraction of event-based IDs matches between the two sets) in sub-step 416. In some embodiments, the validation module adjusts the threshold fraction depending on a policy type of the externally controlled policy. For example, a threshold fraction for an access granting policy can be configured to be higher than a threshold fraction for a monitoring policy or a usage restriction policy. In response to determining that no match exists between any event-based ID pairs of the dynamic confirmation set and the bound ID set, the validation module can invalidate and reject the policy-related record in the sub-step 416.

While processes or blocks in the figures are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 5A:
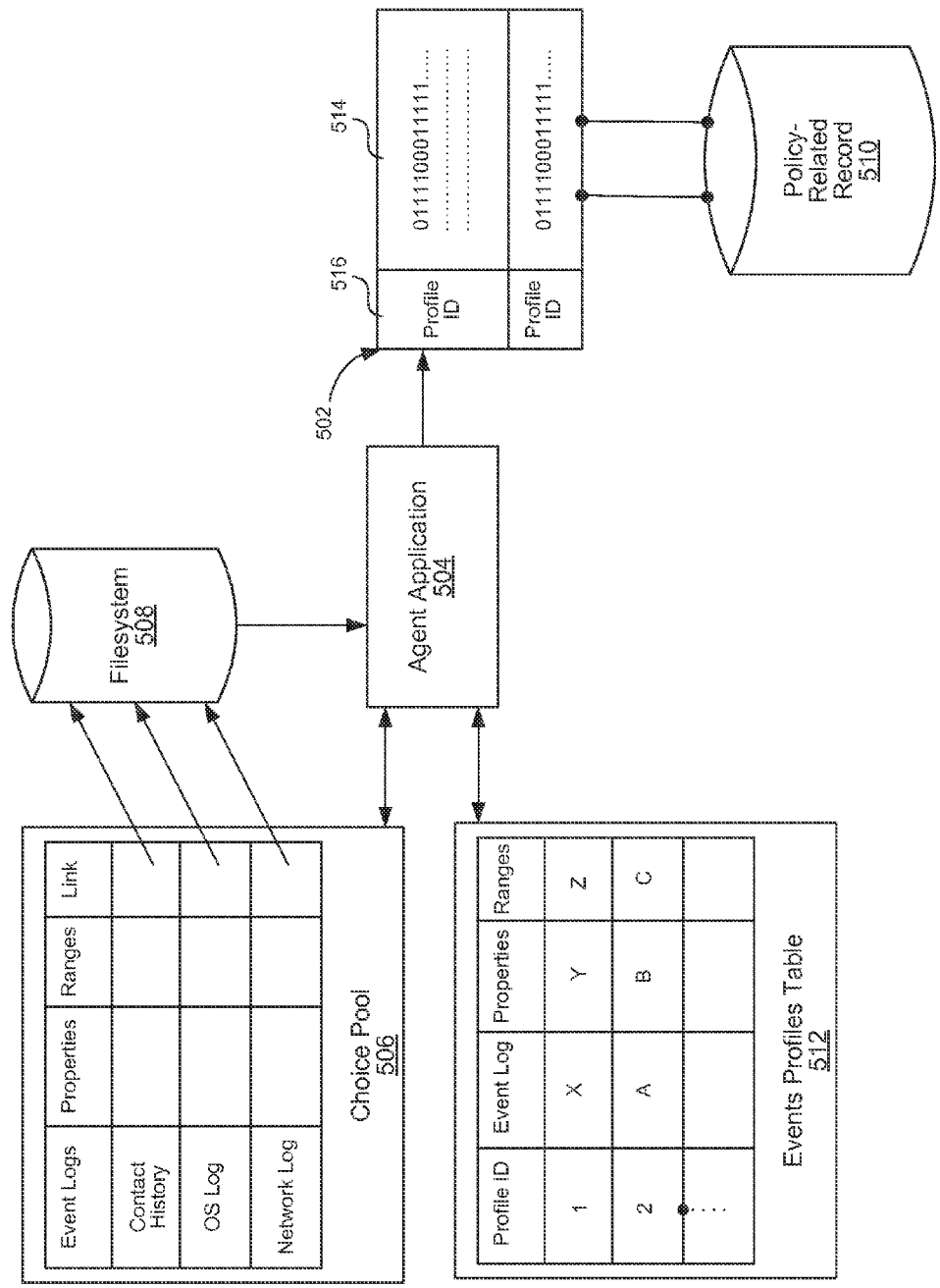
FIG. 5A illustrates a data flow diagram of how an event-based ID is generated and used, in accordance with various embodiments.

FIG. 5A illustrates a data flow diagram of how an event-based ID 502 is generated and used on a computing device (e.g., the computer device 200 of FIG. 2), in accordance with various embodiments. The data flow diagram illustrates how an agent application 504, such as the agent application 202 of FIG. 2, generates the event-based ID 502. The agent application 504 (e.g., the ID generator module 204 of the agent application 202) can maintain a choice pool 506 of candidate event logs that may serve as inputs to generate the event-based ID 502. The choice pool 506 can be a data table of locations of event logs in a filesystem 508 of the computing device. For example, the choice pool 506 includes links or references to the locations of the event logs on the filesystem 508. The choice pool 506 can also store information about what event properties are available in the event logs and what time ranges are available in each event log that is tracked in the choice pool 506. The agent application 504 can periodically check for presence of new event logs on the filesystem 508 and updates to the event logs on the filesystem 508 in order to update the choice pool 506. The choice pool 506 can include both read-only event logs and writable event logs. In some embodiments, the choice pool 506 includes only read-only event logs. In some embodiments, the choice pool 506 specifies if an event log is read-only or writeable, such that the agent application 504 can prefer a read-only event log over a writeable event log for increased security.

The agent application 504 generates the event-based ID 502 whenever the agent application 504 or an influencer principal server of the agent application 504 needs to bind an identifier of the computing device with a policy-related record 510 secured by the agent application 504. The policy-related record 510 may be associated with an externally controlled policy managed by the influencer principal server. For example, the policy-related record 510 is a record indicating the policy, a change in the policy, or a data tracked or collected in accordance with the policy.

When generating a new instance of the event-based ID 504, the agent application 504 determines a new events profile indicating parameters for composing the event-based ID 504. The events profile can include references to one or more event properties in one or more time ranges from one or more event logs. The agent application 504 updates the new events profile in an events profiles table 512. The events profiles table 512 stores new instances of the events profile and stores a mapping between the events profile instances and corresponding events profile IDs.

The agent application 504 uses the references from the events profile to identify the event properties, concatenate the event properties, and process the event properties to calculate a numeric hash portion 514 of the event-based ID 504. The agent application 504 can include (e.g., append or prepend) a corresponding events profile ID 516 of the new events profile to the event-based ID 504.

In some embodiments, the agent application 504 sends the event-based ID 504 to the influencer principal server. The influencer principal server then binds the event-based ID 504 to the policy-related record 510 (e.g., a policy change or policy-related data proposed by the agent application 504 or a new policy provided by the influencer principal server) At a later time, the agent application 504 can validate the policy-related record 510 by re-deriving the event-based ID 502 using only the events profile ID 516 and access to the filesystem 508. For example, the agent application 504 can extract the events profile based on the events profile ID 516, identify the event properties in the filesystem 508 according to the events profile, concatenate the event properties, and calculate a numeric hash for comparison against the numeric hash portion 514 to validate the policy-related record 510.

FIG. 5B and FIG. 5C respectively illustrate two example tables of events from a computer device (e.g., the computer device 200 of FIG. 2). The first table in FIG. 5B is a first table 550 of events chosen from two time ranges within "Windows Logs\Security." FIG. 5C is a second table 560 of events chosen from one time range within "Windows Logs\System".

Because all five properties of events from the "Windows Logs\Security" appear to add uniqueness, in this example, all properties will be included in the derivation of event-based IDs. In the "Windows Logs\System", the "Task Category" property does not add any uniqueness and the "Level" property is just a categorization of the event and does not add any uniqueness. Accordingly, the Date and Time, Source, and Event ID properties of "Windows Logs\System" are included in the derivation of Events IDs.

Here is an example an events profile and its associated events profile ID for the above scenario:
Events Profile ID: 23
Events Profile (in order):
  Event Log: Windows Logs\Security
    Properties (in order):
      Keywords
      Date and Time
      Source
      Event ID
      Task Category
    Time Ranges (in order):
      2014-02-23 18:00 to 2014-02-23 19:00
      2014-02-24 10:00 to 2014-02-24 12:00
  Event Log: Windows Logs\System
    Properties (in order):
      Date and Time
      Source
      Event ID
    Time Ranges (in order):
      2014-02-23 17:30 to 2014-02-23 17:45

If a compact representation of an event-based ID is not necessary, the event-based ID can simply be the events profile ID and the sequence of characters which consists of the chosen properties of each chosen event. An example of this sequence of characters 570 for the events in the two tables is shown in FIG. 5D. That example sequence of characters uses the horizontal tab character {HT} to separate the properties of each event and uses the carriage return and line feed characters {CR} {LF} to terminate each event. The choice of these separation and termination characters is arbitrary. The space character is represented by {SP}.

If a compact representation is necessary, the non-compact representation can be compressed by any means. An example of such means is a hash algorithm, and an example of a hash algorithm is the MD5 hash function. The MD5 hash algorithm applied to the (very long) non-compact representation would be: "5709F8CE6147FF45212948BDA8AB7E3F". The events profile ID can be prepended to the above hash to represent the event-based ID: "23 5709F8CE6147FF45212948BDA8AB7E3F".

If, for example, a different events profile with, an events profile ID of 24 excluded the "2014-02-24 10:00" to "2014-02-24 12:00" time range from the "Windows Logs\Security" log, the example MD5 hashed representation of the Events ID for this event profile would be completely different: "24 B555C03644F985352BC5C1C10C923697"

A hash function advantageously hides the event logs and the event properties used by the ID generator module. Hashing prevents the possessor of a device from finding out information about what to duplicate (e.g., to circumvent a category 1 policy) or change (e.g., to circumvent categories 2 and 3 policies). Prepending or appending some or all of the events profile ID to the events extracted enable the events profile ID to add uniqueness to the event-based ID. However, in most cases, it is not necessary to look for further uniqueness. For example, if an events profile includes only the Date and Time event properties of even one event log, those events could provide sufficient uniqueness from which to derive an event-based ID.

Figure 6:
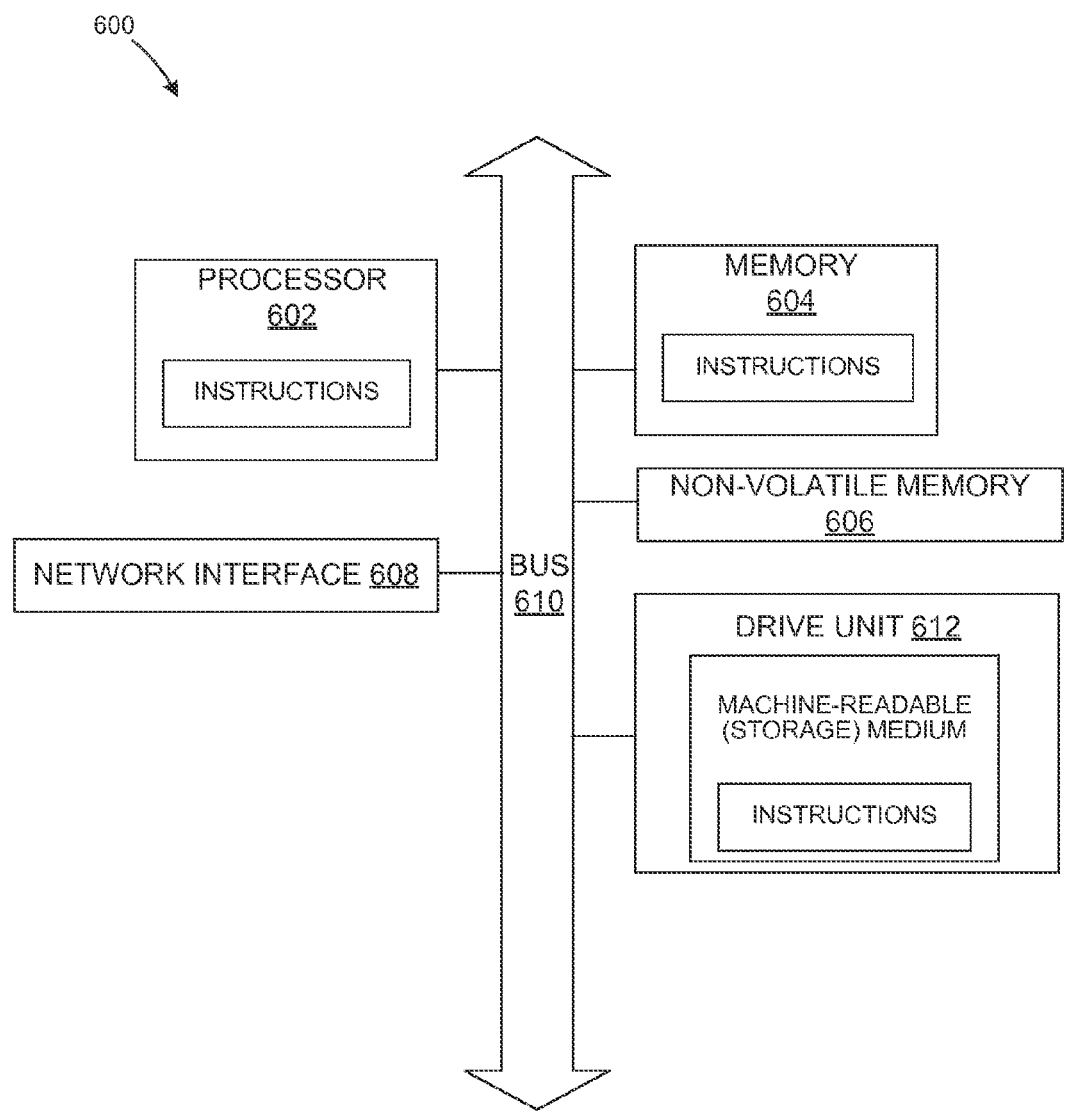
FIG. 6 is a diagrammatic representation of a machine in the example form of a computer system within which a set of instructions, for causing the machine to perform any one or more of the methodologies or modules discussed herein, may be executed.

FIG. 6 is a block schematic diagram that depicts a machine in the exemplary form of a computer system 600, within which a set of instructions for causing the machine to perform any of the herein disclosed methodologies (e.g., FIGS. 3-4) may be executed. For example, the computer system 600 can be the computing devices 104 or the influencer principal server 106 of FIG. 1 or the verification server 306 of FIG. 3. In some embodiments, the computer system 600 may include a network router, a network switch, a network bridge, personal digital assistant (PDA), a cellular telephone, a Web appliance or any machine capable of executing or transmitting a sequence of instructions that specify actions to be taken. The computer system 600 is intended to illustrate a hardware device on which any of the instructions, processes, modules and components depicted in the figures above (and any other processes, techniques, modules and/or components described in this specification) can be implemented. As shown, the computer system 600 includes a processor 602, memory 604, non-volatile memory 606, and a network interface 608. Various common components (e.g., cache memory) are omitted for illustrative simplicity. The computer system 600 can be of any applicable known or convenient type, e.g., a personal computer (PC), server-class computer or mobile device (e.g., smartphone, card reader, tablet computer, etc.). The components of the computer system 600 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 602. The memory 604 is coupled to the processor 602 by, for example, a bus 610. The memory 604 can include, by way of example but not limitation, random access memory (RAM), e.g., dynamic RAM (DRAM) and static RAM (SRAM). The memory 604 can be local, remote, or distributed.

The bus 610 also couples the processor 602 to the non-volatile memory 606 and drive unit 612. The non-volatile memory 606 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 606 can be local, remote, or distributed.

The data structures, modules, and instruction steps described in the figures above may be stored in the non-volatile memory 606, the drive unit 612, or the memory 604. The processor 602 may execute one or more of the modules stored in the memory components.

The bus 610 also couples the processor 602 to the network interface 608. The network interface 608 can include one or more of a modem or network interface. A modem or network interface can be considered to be part of the computer system 600. The network interface 608 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification.

What is claimed is:

1. A computer-implemented method of establishing an identifier of an operating environment of a computing device, comprising:
   identifying a choice pool of candidate event logs in the operating environment of the computing device;
   receiving an ID generation request to generate the identifier of the operating environment for binding with a policy-related record associated with an externally controlled policy enforced through an agent application;
   in response to receiving the ID generation request, generating an events profile and a profile ID associated with the events profile, wherein generating the events profile includes selecting a first event log from the choice pool and selecting a first event property from the first event log;
   generating an event-based device ID based at least partly on the selected first event property extracted from the first event log according to the events profile, the event-based device ID including a reference to the profile ID of the events profile, wherein the event-based device ID serves as the identifier of the operating environment;
   wherein generating the event-based device ID includes hashing event properties into a hash value to be part of the event-based device ID; and
   storing the policy-related record that is bound to the event-based device ID.

2. The computer-implemented method of claim 1, further comprising reporting the event-based device ID to a principal server associated with the agent application to bind the policy-related record to the event-based device ID.

3. The computer-implemented method of claim 1, wherein the events profile includes multiple event properties from one or more event logs; and wherein generating the event-based device ID based on the multiple event properties.

4. The computer-implemented method of claim 1, wherein the event log is available in the operating environment of the computing device and wherein the event log is generated by an operating system of the computing device or an application running on the operating system.

5. The computer-implemented method of claim 1, further comprising: generating multiple events profiles and profile IDs associated therewith; wherein said generating the event-based device ID includes generating multiple event-based device IDs based respectively on the multiple events profiles;

and wherein said binding includes binding the multiple event-based device IDs to the policy-related record.

6. The computer-implemented method of claim 1, wherein the computing device is a virtual machine.

7. The computer-implemented method of claim 1, wherein the events profile specifies a time range within the first event log to extract the first event property.

8. The computer-implemented method of claim 1, wherein generating the event-based device ID further includes prepending or appending the profile ID to the hash value, wherein the event-based device ID is a digital string that includes the hash value and the profile ID.

9. The computer-implemented method of claim 1, wherein generating the event-based device ID includes concatenating the event properties into a digital string to serve as part of the event-based device ID.

10. The computer-implemented method of claim 1, further comprising:
    generating a new events profile and a new profile ID associated with the new events profile, in response to determining that the policy-related record is updated, the new events profile specifying at least a second event property in a second event log;
    generating a new event-based device ID based at least partly on the second event property extracted from the second event log according to the new events profile, the new event-based device ID including a reference to the new profile ID, wherein the new events profile is at least partially different from the events profile; and
    providing the new event-based device ID to be bound to the updated policy-related record.

11. The computer-implemented method of claim 1, further comprising:
    periodically generating a new event-based device ID to bind to the policy-related record based on a schedule configured in the agent application.

12. The computer-implemented method of claim 1, wherein identifying the choice pool includes identifying the candidate event logs that are readable-only files on a filesystem of the operating environment.

13. The computer-implemented method of claim 1, wherein identifying the choice pool includes maintaining the choice pool by monitoring for any new event log that becomes available through the operating environment of the computing device.

14. The computer-implemented method of claim 1, wherein identifying the choice pool includes analyzing a uniqueness factor of the candidate event logs in the choice pool based on log size of the candidate event logs or diversity of values of event properties of the candidate event logs.

15. A computer-implemented method of validating an identifier of an operating environment of a computing device, comprising:
    initiating a validation request for a policy-related record associated with an externally controlled policy enforced by an agent application in the computing device;
    in response to the validation request, retrieving, via the agent application running on the computing device, an events profile associated with an original event-based ID bound by the agent application to the policy-related record;
    deriving, in real-time, a dynamic event-based ID based at least partly on a first event property in a first event log as identified in the events profile, the first event log being a log maintained by an operating system of the computing device or an application running on the operating system;
    wherein deriving includes:
        extracting event properties from event logs in the operating environment of the computing device, the event properties indicated in the events profile; and
        generating a hash value based on the extracted event properties to be part of the dynamic event-based ID;
    comparing the dynamic event-based ID against the original event-based ID; and
    determining whether to validate the policy-related record based on whether the dynamic event-based ID matches the original event-based ID.

16. The computer-implemented method of claim 15, wherein initiating the validation request is in response to a predetermined schedule.

17. The computer-implemented method of claim 15, wherein retrieving the events profile includes:
    retrieving an events profile ID from the original event-based ID bound to the policy-related record; and
    matching the events profile ID to a data storage link referencing at least a storage location of the first event log in a filesystem of the computing device, the data storage link maintained by the agent application from a time when the original event-based ID was generated.

18. The computer-implemented method of claim 15, wherein said retrieving the events profile includes retrieving an original set of event-based IDs bound by the agent application to the policy-related record, the original set includes events profile IDs that correspond respectively to the event-based IDs, the original set including the original event-based ID; and wherein said deriving includes deriving, in real-time, a dynamic set of event-based IDs based on the events profiles corresponding to the events profile IDs.

19. The computer-implemented method of claim 18, wherein said determining whether to validate depends on a threshold fraction configured into the agent application; and wherein determining whether to validate includes determining whether a fraction of the dynamic set that matches the original set is below, equal to, or greater than the threshold fraction.

20. The computer-implemented method of claim 19, wherein said determining whether to validate includes adjusting the threshold fraction depending on a policy type of the externally controlled policy.

21. The computer-implemented method of claim 18, wherein said determining whether to validate includes determining to validate the policy-related record when the dynamic set partially matches the original set.

22. The computer-implemented method of claim 21, further comprising generating a new set of event-based IDs to replace mismatching event-based IDs between the original set and the dynamic set; and binding the new set to the policy-related record.

23. A non-transitory computer-readable storage medium comprising executable instructions that, when executed by a processor, are configured to implement a computer-implemented process, the computer-implemented process comprising:
    identifying a choice pool of candidate event logs in an operating environment of the computing device;
    receiving an ID generation request to generate an identifier of the operating environment to bind to a policy-related record associated with an externally controlled policy enforced through an agent application;
    in response to receiving the ID generation request, generating an events profile and a profile ID associated with the events profile, wherein generating the events profile includes selecting a first event log from the choice pool and selecting a first event property from the first event log;
generating an event-based device ID based at least partly on the selected first event property extracted from the first event log according to the events profile, the event-based device ID including a reference to the profile ID of the events profile, wherein the event-based device ID serves as the identifier of the operating environment;
wherein generating the event-based device ID includes hashing the event properties into a hash value to be part of the event-based device ID; and
storing the policy-related record that is bound to the event-based device ID.

* * * * *